(12) United States Patent
Zommer (10) Patent No.: US 9,276,628 B1
(45) Date of Patent: Mar. 1, 2016

(54) PHOTOVOLTAIC CELL AND E-INK DISPLAY ON THE FRONT SIDE OF A CELL PHONE CASE

(71) Applicant: IXYS Corporation, Milpitas, CA (US)

(72) Inventor: Nathan Zommer, Fort Lauderdale, FL (US)

(73) Assignee: IXYS Corporation, Milpitas, CA (US)

( * ) Notice: Subject to any disclaimer, the term of this patent is extended or adjusted under 35 U.S.C. 154(b) by 14 days.

(21) Appl. No.: 14/530,750

(22) Filed: Nov. 1, 2014

(51) Int. Cl.
*H04M 1/00* (2006.01)
*H04B 1/3888* (2015.01)

(52) U.S. Cl.
CPC .................................... *H04B 1/3888* (2013.01)

(58) Field of Classification Search
CPC .... H04B 1/3888; H04M 1/0283; H04M 1/18; H04M 1/0214; H04M 1/0216; H04M 1/0245; H04M 2250/16; H04M 1/23; H04M 1/0247; H04M 1/0237; A45C 2011/002; G06F 1/1616
USPC ............. 455/550.1, 575.1, 575.3, 575.8, 90.3
See application file for complete search history.

(56) References Cited

U.S. PATENT DOCUMENTS

| | | | |
|---|---|---|---|
| 7,321,354 B1* | 1/2008 | Jacobsen ................ | H04N 7/142 345/102 |
| 8,759,675 B2* | 6/2014 | Rajeswaran .......... | G06F 1/1626 174/50 |
| 9,225,813 B2* | 12/2015 | Chapman ................ | H04M 1/04 |
| 2008/0096620 A1* | 4/2008 | Lee ........................ | G06F 1/1626 455/575.8 |
| 2014/0128131 A1* | 5/2014 | Sin ........................ | H04M 1/185 455/575.8 |
| 2015/0065208 A1* | 3/2015 | Balaji ..................... | H04M 1/04 455/575.8 |

* cited by examiner

*Primary Examiner* — Nhan Le
(74) *Attorney, Agent, or Firm* — Imperium Patent Works; T. Lester Wallace

(57) ABSTRACT

A cellular telephone case has front and back panels. A cellular telephone is coupled to the case by pushing the telephone into the case such that the main dock connector of the telephone engages a plug on the back panel. When the telephone is in this position, a back surface of the telephone is held in place on an inside surface of the back panel. The front panel is hinged so that it folds over and covers the telephone. In this folded position, the upward and outward facing outside surface of the front panel includes an E-ink display, a plurality of photovoltaic cells for charging a rechargeable battery of the case, and several buttons. Image information from the telephone is transferred to the case through the dock connector, and then viewed on the display using energy stored in the battery, even after the telephone has been decoupled from the case.

20 Claims, 9 Drawing Sheets

CASE
(OPEN WITHOUT CELL PHONE)

CELL PHONE/CASE ASSEMBLY
(WITH CASE CLOSED)

FIG. 1

CELL PHONE/CASE ASSEMBLY
(WITH CASE OPEN)

FIG. 2

CASE
(OPEN WITHOUT CELL PHONE)

FIG. 3

FIG. 4 TOP-DOWN VIEW OF CELL PHONE/CASE ASSEMBLY

FIG. 5 CROSS SECTIONAL VIEW TAKEN ALONG LINE A-A'

FIG. 6 CROSS SECTIONAL VIEW TAKEN ALONG LINE B-B'

FIG. 7

HARD BACK SHELL CASE
(THE SIDE THAT A CELL PHONE FITS INTO)

FIG. 8

HARD BACK SHELL CASE
(THE E-INK DISPLAY SIDE)

FIG. 9

FIG. 13 TOP-DOWN VIEW OF CELL PHONE/CASE ASSEMBLY

FIG. 14 CROSS SECTIONAL VIEW TAKEN ALONG LINE A-A'

CROSS SECTIONAL VIEW TAKEN ALONG LINE B-B'

FIG. 15

FIG. 16 TOP-DOWN VIEW OF THE FRONT OF THE CELL PHONE/ CASE ASSEMBLY

FIG. 17 CROSS SECTIONAL VIEW TAKEN ALONG LINE A-A'

FIG. 18 CROSS SECTIONAL VIEW TAKEN ALONG LINE B-B'

FIG. 19 CROSS SECTIONAL VIEW TAKEN ALONG LINE C-C'

FIG. 20 LOOKING DOWN INTO THE INSIDE OF THE CASE (NO CELL PHONE)

FIG. 21 AUDIO JACK CORNER OF THE CASE

PHOTOVOLTAIC CELL AND E-INK DISPLAY ON THE FRONT SIDE OF A CELL PHONE CASE

TECHNICAL FIELD

The described embodiments relate generally to cellular telephone cases, and to related methods.

BACKGROUND INFORMATION

There exists a substantial number of commercially available cellular telephone cases that provide low-power electrophoretic displays (referred to as E-ink or E-paper displays). All of these devices, however, are functionally and operatively deficient in a certain way. For example, a device known as a Popslate snaps onto the back of a cellular telephone, and provides an E-ink display on the bottom side of the assembly. There are also flip-style folding cellular telephone cases that provide E-ink displays on the front face sides of cases. For example, the so-called InkCase available from Oaxis has an E-ink display on the front face side of a folding cellular telephone case. A RF wireless communication link is provided to communicate between the cellular telephone and the device. A flip-style case for the Alcatel OneTouchHero cellular telephone is similar in this way. So-called "snap-fit hard back" shell cases carrying solar cells for charging the cellular telephone's batteries are available on the market where the dock connector of the cellular telephone mates with a plug on the charging snap-fit case. The so-called Solar Case available from Ascent Solar's is an example of such a hard back shell case for an Apple iPhone. There are also other types of flip-style cases. A flip-style case known as the CoverReader, and available from PocketBook, mates with the dock connector of a cellular telephone in similar fashion to the Solar Case when the cellular telephone is snapped in place in the case, but the CoverReader provides an E-ink display on the inside panel of the folding cover of the case. In similar fashion, a flip-style case is described in U.S. Pat. No. 8,760,405, where solar cells are provided on the outside front face side of the folding cover of the case. An improved and different cellular telephone case that has additional functionality is desired.

SUMMARY

Despite all the permutations of features of the many E-ink display cellular telephone cases described above, none of these cases can be left on a surface indoors, such as on a desk or table or counter, where the E-ink display is left facing upward and is continuously visible, and where the photovoltaic cells are at the same time also facing upward and are at the same time receiving energy from relatively low-intensity indoor artificial lighting, and where the bottom backside of the cellular telephone is being protected from the surface by the case, and where if the case is removed from the cellular telephone then the energy stored in rechargeable batteries in the case maintains an image being displayed on the E-ink display. None of the E-ink display telephone cases, that when removed in this way from its cellular telephone, has a button on its outside face surface that is usable to manipulate the image displayed on the E-ink display where the E-ink display is powered only by the case.

In a first novel aspect, a folding cellular telephone case has a back side panel and a hinged front side panel, where a cellular telephone can be snapped in place onto an inside surface of the back side panel such that a main dock connector of the cellular telephone mates with a corresponding plug on the case, where the inside surface of the back side panel is substantially conformal to a back side of the cellular telephone, and where the front side panel is hinged to the back side panel so that the front side panel can fold over and cover the display of the cellular telephone when the cellular telephone is snapped in place onto the back side panel. The front side panel of the folding cellular telephone case has an inside surface (that covers and faces the main touch screen display of the cellular telephone when the telephone is in place in the case) and an outside face surface (that is opposite to the inside surface and that faces upward if the case/cell phone assembly is resting face up on a surface such as a desk). The front side panel of the case comprises an E-ink display, a plurality of high-efficiency single-crystal photovoltaic devices, a rechargeable battery, a plurality of buttons, and electronic circuitry. The E-ink display is disposed on the outside face surface, and the photovoltaic cells are also disposed on the outside face surface, such that the display and the cells occupy different non-overlapping portions of the outside face surface of the front side panel. The photovoltaic cells are coupled so that they can charge the rechargeable battery of the case, but so that they do not and cannot provide a charging current to the cellular telephone's main battery through the cellular telephone's main dock connector. Similarly, the E-ink display is coupled so that it draws power from the rechargeable battery of the case, and does not and cannot draw power from the cellular telephone's main battery through the dock connector. The known inability of the case to draw down the charge of the main battery of the cellular telephone is an important characteristic of the case.

Another important characteristic of the novel case of the first aspect is that the electronic circuitry drives the E-ink display such that image information received from the cellular telephone via the telephone's dock connector is displayed on the E-ink display in a first time period when the cellular telephone is docked to the case. If the case in this state is then disconnected from the cellular telephone, then during a second time period the electronic circuitry of the case continues to drive the E-ink display such that the same image information continues to be displayed on the E-ink display in a non-interrupted fashion. During the second time period, the buttons on the outside face surface of the case are usable to control how the image information is displayed on the E-ink display. Where the case is not connected to any AC-to-DC power adapter energy source, only energy stored in the rechargeable battery of the case, or received at that time onto the photovoltaic cells of the case, is used to power the E-ink display during the second time period. During the second time period, a first user can handle and use the cellular telephone separate and apart from the case. At the same time, a second user can handle and use the case separate and apart from the cellular telephone. The second user may, for example, use the buttons on the face of the case to scroll through the image information displayed on the E-ink display of the case. During the second time, the case can be used without any AC-to-DC power adapter energy source, so that the case is powered by energy stored in the rechargeable battery of the case. This functionality of the case is provided without the case involving power hungry, complex, problematical, and costly RF wireless transceiver circuitry.

The novel case of the first aspect also includes a socket disposed on the outside of the case. If a power cord plug of an external AC-to-DC power adapter is plugged into this socket, then a charging current from the external power adapter can flow in a charging current path through the cord, into the case through the socket, through the case, and through the plug of the case, and to the cellular telephone thereby charging and/or powering the cellular telephone. Similarly, a charging current from the external power adapter can flow in a charging current path through the cord, into the case through the socket, through the electronic circuitry, through the hinge, and to the rechargeable battery and/or E-ink display on the front side panel thereby powering the case and charging the battery of the case. The AC-to-DC adapter can be used to power the case, and/or to charge the battery of the case, with or without the cellular telephone being docked into the case.

In a second novel aspect, a one-piece hard back shell case for a cellular telephone fits over and covers the back surface of the cellular telephone so that the main touch screen display of the cellular telephone is exposed, and so that the back surface of the cellular telephone is protected and covered by the case. The form factor of the cellular telephone may, in one example, is that of an Apple iPhone. Disposed on the outward facing bottom surface of the case are an E-ink display, a plurality of high-efficiency single-crystal photovoltaic cells, and a plurality of buttons. The case includes a rechargeable battery that is charged by the photovoltaic cells, and that cannot be charged by energy from the main battery of the cellular telephone. The case includes a socket for receiving power from an external AC-to-DC power adapter. The case also includes a plug that mates to the dock connector of the cellular telephone. If the case is not connected to any such AC-to-DC adapter, then the E-ink display is only powered by energy stored in the rechargeable battery and/or by energy captured by the photovoltaic cells at that time. The battery of the case is not charged by energy drawn from the main battery of the cellular telephone. Similarly, the E-ink display of the case is not powered by energy drawn from the main battery of the cellular telephone. An AC-to-DC adapter can be used to power the case, and/or to charge the battery of the case, through the case socket either with or without a cellular telephone being docked into the case.

In a first time period, image information received onto the case from the cellular telephone via the telephone's dock connector is displayed on the E-ink display when the dock connector of the cellular telephone is docked to the plug of the case. If the case in this state is then disconnected from the cellular telephone, then during a second time period the electronic circuitry of the case continues to drive the E-ink display such that the same image information continues to be displayed on the E-ink display. During the second time period, the buttons on the outside face surface of the case are usable to control how the image information is displayed on the E-ink display. If an AC-to-DC adapter is not coupled to the case, then only energy stored in the rechargeable battery of the case, or received at that time onto the photovoltaic cells of the case, is used to power the E-ink display during the second time period. During the second time period, a first user can handle and use the cellular telephone separate and apart from the case, whereas a second user can handle and use the case separate and apart from the cellular telephone with the buttons on the case being usable by the second user to scroll through the image information displayed on the E-ink display of the case. This functionality by the case is provided without the case involving power hungry, complex, and costly RF wireless transceiver circuitry.

In some examples of the second novel aspect, the case includes a removable auxiliary component. In one example, this removable auxiliary component is an auxiliary lens. The lens is provided on the case in such a way that it serves as an auxiliary lens for a camera of the cellular telephone, where the camera's main lens is disposed substantially flush with the back surface of the cellular telephone. A threaded hole may be provided in the case so that various different lenses having matching threads can be removably threaded into, and threaded out of, the hole in the case. In some examples, the case also includes an optical focusing lens or diffuser that is provided on the case in such a way that the lens or diffuser passes light emanating from a flash lamp disposed on the back surface of the cellular telephone. This lens or diffuser can be provided with threads, and can be removably threaded into, and threaded out of, a threaded hole in the case.

In some examples of the second novel aspect, the case has an audio player functionality and includes one or more audio speakers, an audio jack, an ability to store audio files, and an ability to play audio files. The speakers are provided, along with the E-ink display and the buttons, on the outward facing bottom surface of the case. The E-ink display is usable to display information about audio information, such as an audio file playlist. Headphones or earbuds can be removably attached to the case by using the audio jack. The case can be powered either from the rechargeable battery of the case, or from an AC-to-DC power adapter that is removably pluggable into the socket of the case. The electronic circuitry of the case provides an ability: to store audio information such as MP3 audio files, to play the audio files so as to drive the speakers and/or audio jack so that sound emanates from the speakers and/or headphones/earbuds, to display information about the audio information stored in the case and/or being played by the case, and to control the playing of audio files using the buttons on the case. When headphones/earbuds are being driven by the case, the case does not drive the speakers. Audio files and other information can be transferred through the dock connector from the cellular telephone and into the case, but the case is otherwise usable as a standalone audio player (for example, an MP3 player) separately and independently of the cellular telephone.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
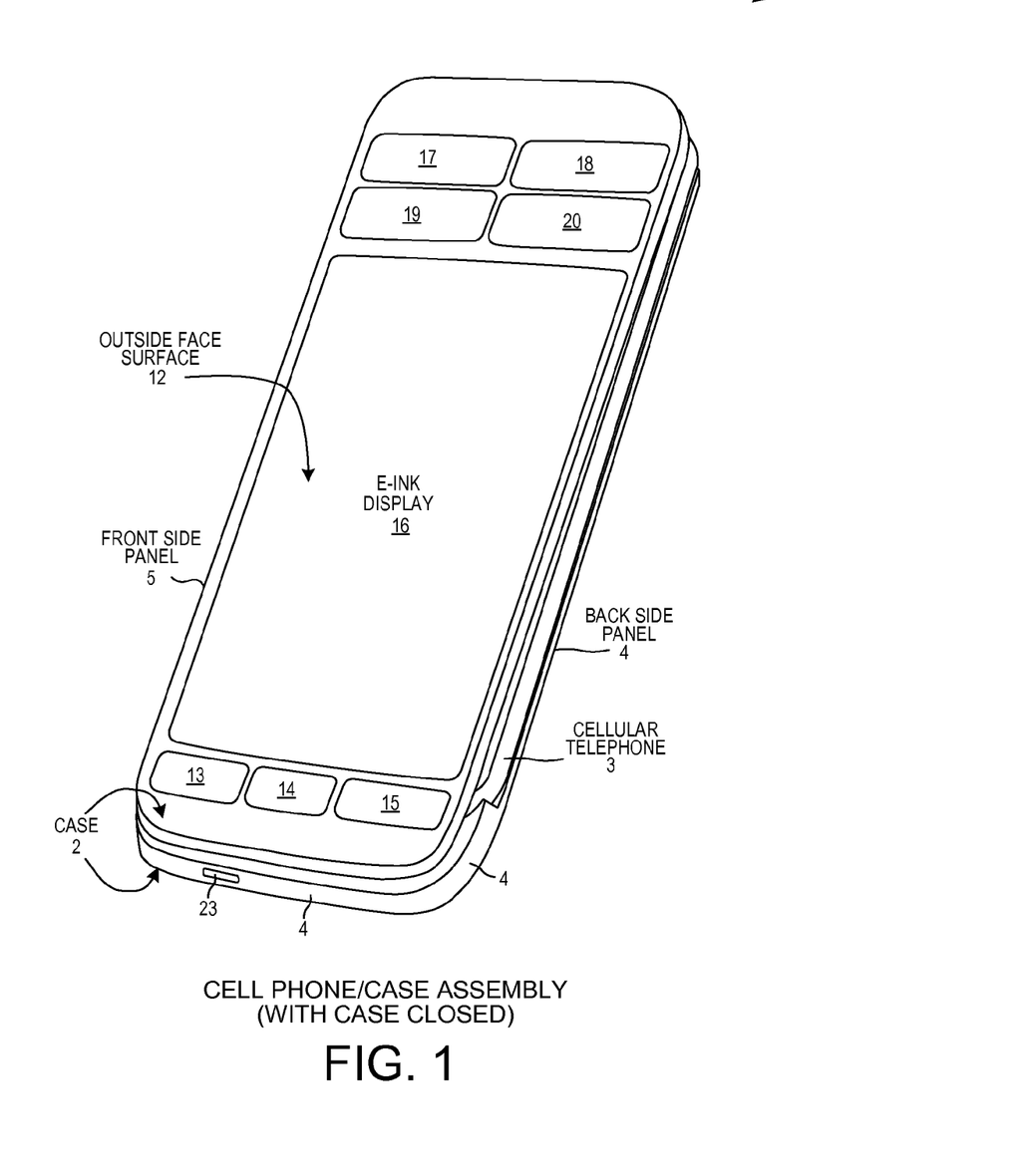
FIG. 1 is a perspective diagram of a cellular telephone/case assembly in accordance with a first novel aspect.

FIG. 1 is a perspective diagram of cellular telephone/case assembly 1 in accordance with a first novel aspect. Assembly 1 includes a folding cellular telephone case 2 that fits over and couples to a dock connector of a cellular telephone 3. The case 2 includes a back side panel 4, a front side panel 5, and a hinge mechanism 6. The hinge mechanism 6 is not seen in the view of FIG. 1. In the illustration of FIG. 1, the front side panel 5 is folded at the hinge mechanism to over the cellular telephone 3 so that the front side panel 5 covers a front surface 7 of the cellular telephone 3 when a back surface 8 of the cellular telephone 3 is snapped onto an inside surface 9 of the back side panel 4 of the case. The back side panel 4 has a peripheral edge that has a substantially rectangular shape. Likewise, the front side panel 5 has a peripheral edge that has a substantially rectangular shape. The substantially rectangular shape of the front side panel matches the substantially rectangular shape of the back side panel as shown in FIG. 1 so that the two panels sandwich the cellular telephone between them as shown. The front side panel 5 has an inside surface 11 that covers and faces the front main display 10 of the cellular telephone 3 when the cellular telephone is docked in place in the case. The front side panel 5 also has an outside face surface 12 that is substantially planar. The outside face surface 12 is opposite to the inside surface 11 and is also substantially planar. If the case 2 is closed so that the front side panel covers the main display of a cellular telephone docked in the case, and if the resulting assembly 1 is then placed on a level support surface (such as the top surface of a desk, or a table, or a counter), then the outside face surface 12 of the assembly 1 faces upward and away from the level surface, and is substantially coplanar with the level support surface. Disposed on or at the outside face surface 12 is a plurality of buttons 13-15, an E-ink 16, and a plurality of high efficiency crystalline photovoltaic cells 17-20. The term "E-ink" here is used as a shorthand term to denote any type of electrophoretic display. The E-ink display 16 is can be viewed from the top when the assembly 1 is resting face-up on the level support surface, and the photovoltaic cells 17-20 are facing upwards so that they can capture energy from relatively low intensity artificial light (for example, artificial light emanating downward toward the assembly from light fixtures disposed on the ceiling of the room). The buttons 13-15 on the case are also facing upward, and are therefore easily accessible and can be pressed without lifting the assembly 1 off of the level support surface. In this position, no portion of the back surface 8 of the cellular telephone is in direct contract with the level support surface, but rather the back surface 8 of the cellular telephone is being protected by the case that largely encases the cellular telephone. In addition to the E-ink display 16, the buttons 13-15, and the photovoltaic cells 17-20, the front side panel 5 also includes a rechargeable battery 21 and an amount of electronic circuitry 22. The rechargeable battery 21 and the electronic circuitry 22 are not seen from the perspective of the illustration of FIG. 1. A socket 23, such as a micro USB (Universal Serial Bus) socket, is provided on the back side panel 4. The plug of a cord of an external AC-to-DC power adapter can be plugged into this socket 23 as described in further detail below. In one example, this plug is a USB plug.

Figure 2:
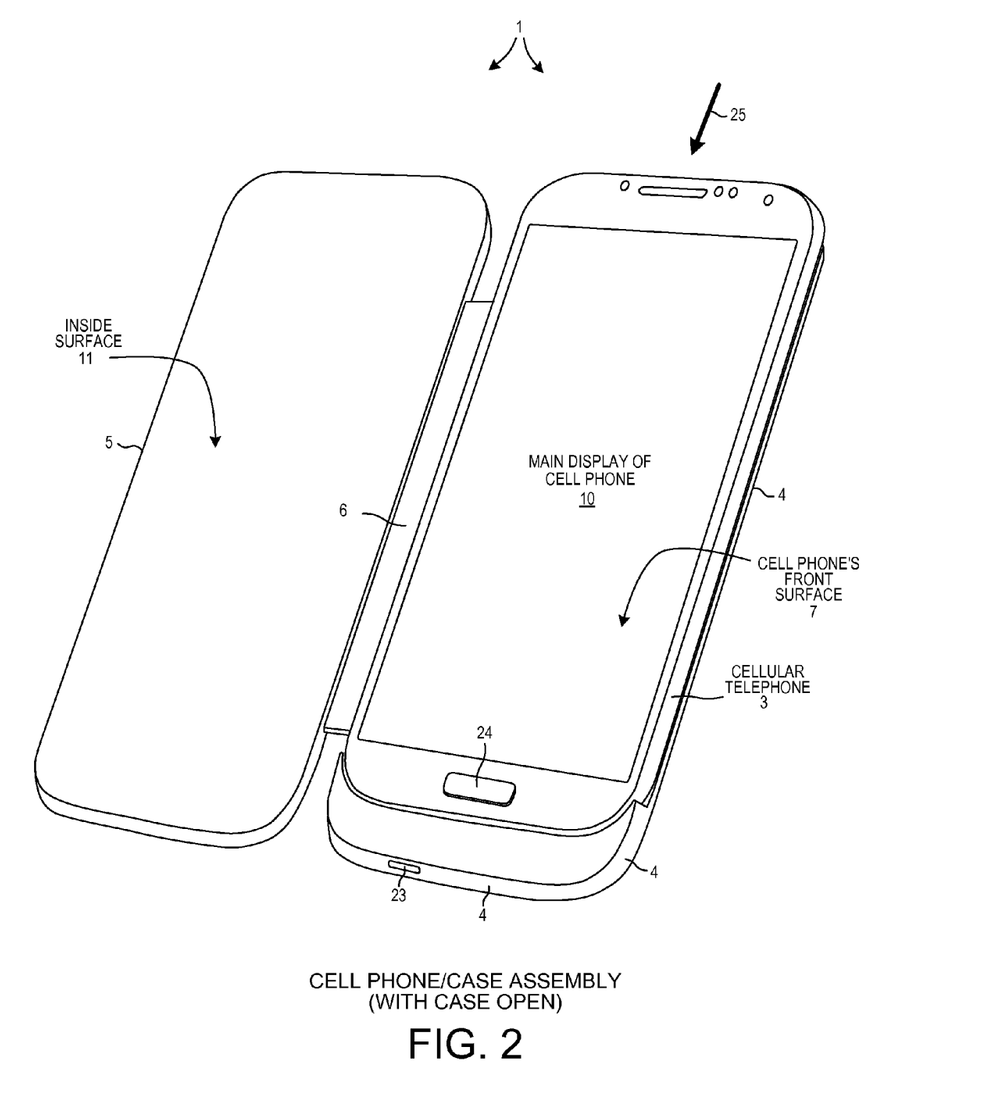
FIG. 2 is a perspective diagram is the cellular telephone/case assembly of FIG. 1, except that in the illustration of FIG. 2 the front side panel is shown in an open and folded-out position.

FIG. 2 is a perspective diagram is the assembly 1 of FIG. 1, except that in the illustration of FIG. 2 the front side panel 5 is shown in an open and folded-out position. In this open and folded-out position, the main display 10 of the cellular telephone is exposed and visible and is accessible by a user. The face side of the cellular telephone, in the example of FIG. 2, includes a button 24 and the main LCD display 10. To "snap fit" the cellular telephone 3 onto the back side panel of the case, the back surface 8 of the cellular telephone is put down on the inside surface 9 of the back side panel 4, and the cellular telephone 3 is pushed in the direction of arrow 25 so that the main dock connector 26 of the cellular telephone mates with a plug 27 of the case. In one example, retaining members 28 that extend inward from the peripheral edge of the inside surface 9 engage and grab onto corresponding features of the cellular telephone so that the cellular telephone can be snapped onto and held in place on the inside surface. The back side panel 4 flexes slightly as the cellular telephone is pressed down in this way and as the retaining members engage, so that the user who pressed the cellular telephone down detects a "snap" sensation when the retaining members 28 snaps back over the corresponding features of the cellular telephone. This retaining member mechanism is but one way that the cellular telephone can be removably docked and fixed to the back side panel. In other embodiments, other retaining structures are provided on the back side panel and the cellular telephone is engaged and is held in place in other ways. The back side panel may, for example, include a single resilient silicone peripheral ring that stretches up and over and engages the side edges and peripheral lip of the cellular telephone. The back side panel may, for example, have the shape of a retaining sleeve or envelope that the cellular telephone slides into.

Figure 3:
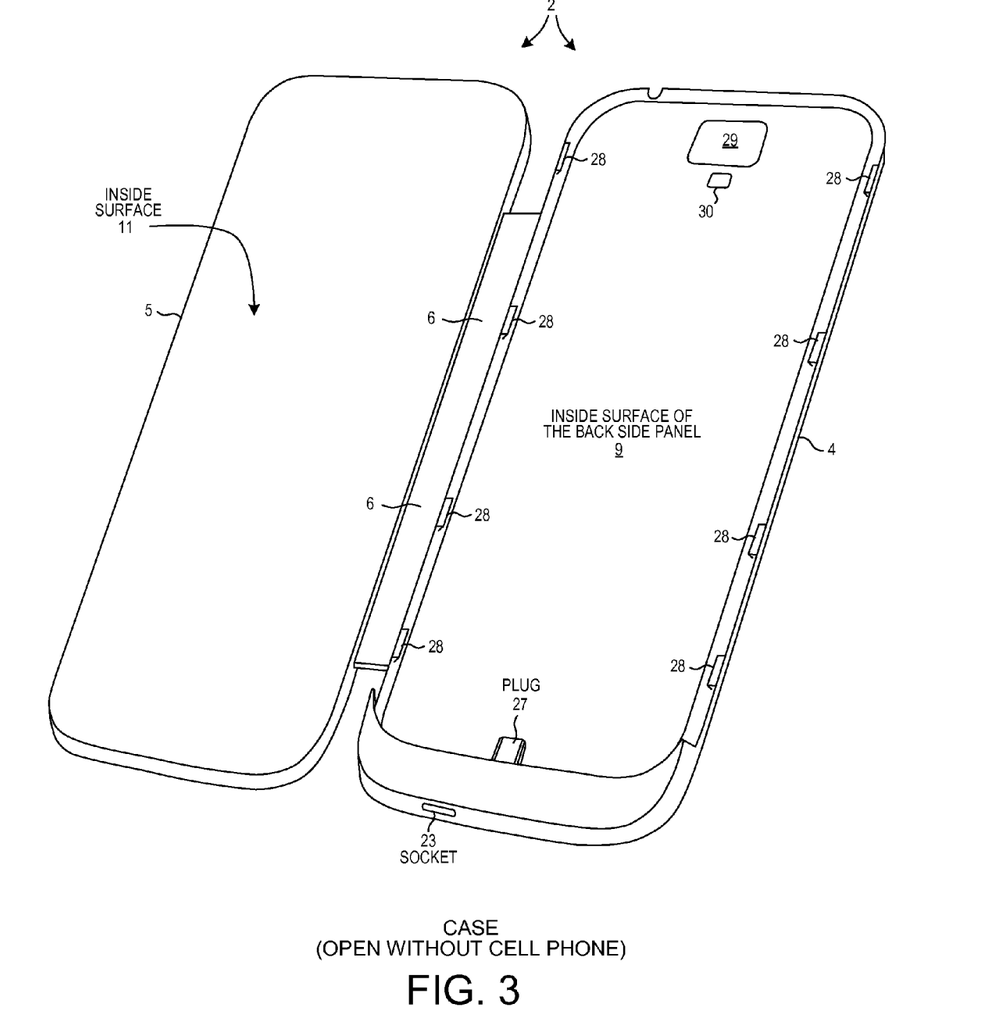
FIG. 3 is a perspective diagram of the case of the assembly of FIG. 1 in the folded-out position, and without the cellular telephone.

FIG. 3 is a perspective diagram of the case 2 without the cellular telephone. The plug 27 of the case is seen extending toward the center of the case, in a direction that is parallel to the surface of the inside surface 9. The plug 27 is positioned as illustrated, so that when the cellular telephone is placed with its back surface 8 down on the inside surface 9 of the back side panel, and when the cellular telephone is then slid down toward the plug 27 in the direction of arrow 25, that the main dock connector socket 26 of the cellular telephone sides over and engages the plug 27 of the case. The back side panel includes an opening 29 for the camera of the cellular telephone so that the camera can capture images through the opening 29 when the cellular telephone is docked in the case.

The back side panel also includes an opening 30 for the flash lamp of the cellular telephone so that the flash lamp will be usable when the cellular telephone is docked in the case. In the present example, there is no display on the inside surface 11 of the front side panel 5.

Figure 4:
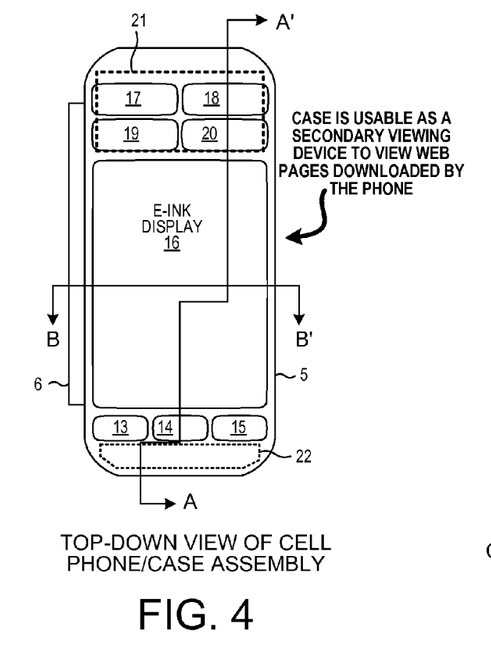
FIG. 4 is a simplified top-down diagram of the assembly of FIG. 1.
Figure 5:
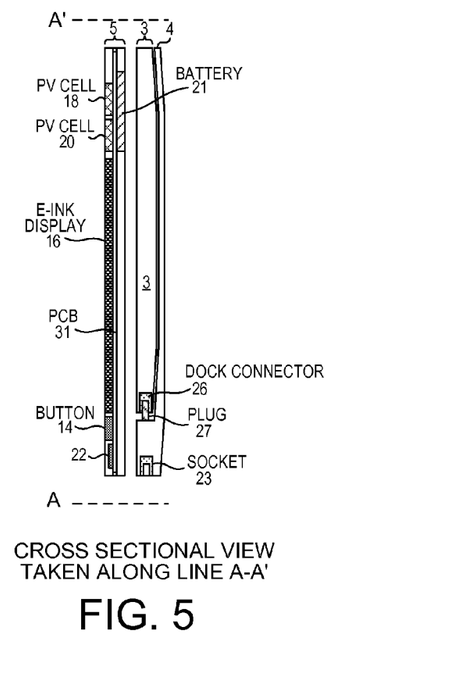
FIG. 5 is a cross-sectional diagram taken along sectional line A-A' of FIG. 4.
Figure 6:
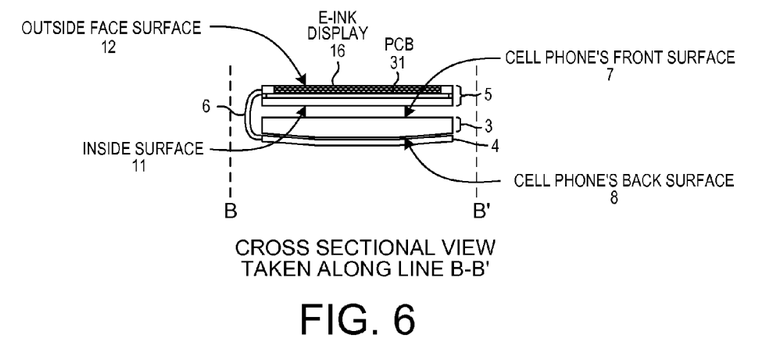
FIG. 6 is a cross-sectional diagram taken along sectional line B-B' of FIG. 4.

FIG. 4 is a simplified top-down diagram of the assembly 1 of FIG. 1. FIG. 5 is a cross-sectional diagram taken along sectional line A-A' of FIG. 4. FIG. 6 is a cross-sectional diagram taken along sectional line B-B' of FIG. 4. In FIG. 4, the dashed line 21 indicates the outline of the rechargeable battery 21 within the front side panel. In FIG. 4, the dashed line 22 indicates the rough outline of the location of the electronic circuitry within the front side panel. Reference numeral 31 identifies a printed circuit board (PCB) that is embedded within the front side panel. The electronic circuitry 22, the E-ink display 16, the buttons 13-15, the photovoltaic cells 17-20, and the rechargeable battery 21 are mounted to this printed circuit board 31. If the plug of a cord of an external AC-to-DC power adapter (not shown) is plugged into socket 23, then a supply current can flow in a current path from the AC-to-DC power adapter plug, through the socket 23, through conductors of the circuitry in the back side panel 4, to the plug 27, and into the cellular telephone via the dock connector 26 of the cellular telephone. This supply current can power the cellular telephone and/or can charge the main battery of the cellular telephone. Similarly, if the plug of the external AC-to-DC power adapter is plugged into socket 23, then the case 2 can be powered directly from the AC-to-DC power adapter, regardless of whether a cellular telephone is docked to the case or not. This external power can power the E-ink display 16 and the electronic circuitry 22 directly and/or can charge the rechargeable battery 21. Such a supply current flows in a current path from the AC-to-DC adapter plug, through the socket 23, through the hinge mechanism 6, and to the front side panel 5. Of importance, the electronic circuitry and power connections of the case are such that the main battery of the cellular telephone cannot power the E-ink display through the dock connector 26. The cellular telephone can supply digital information to the front side panel via the dock connector 26, but the case 2 is otherwise not powered by the cellular telephone.

Figure 7:
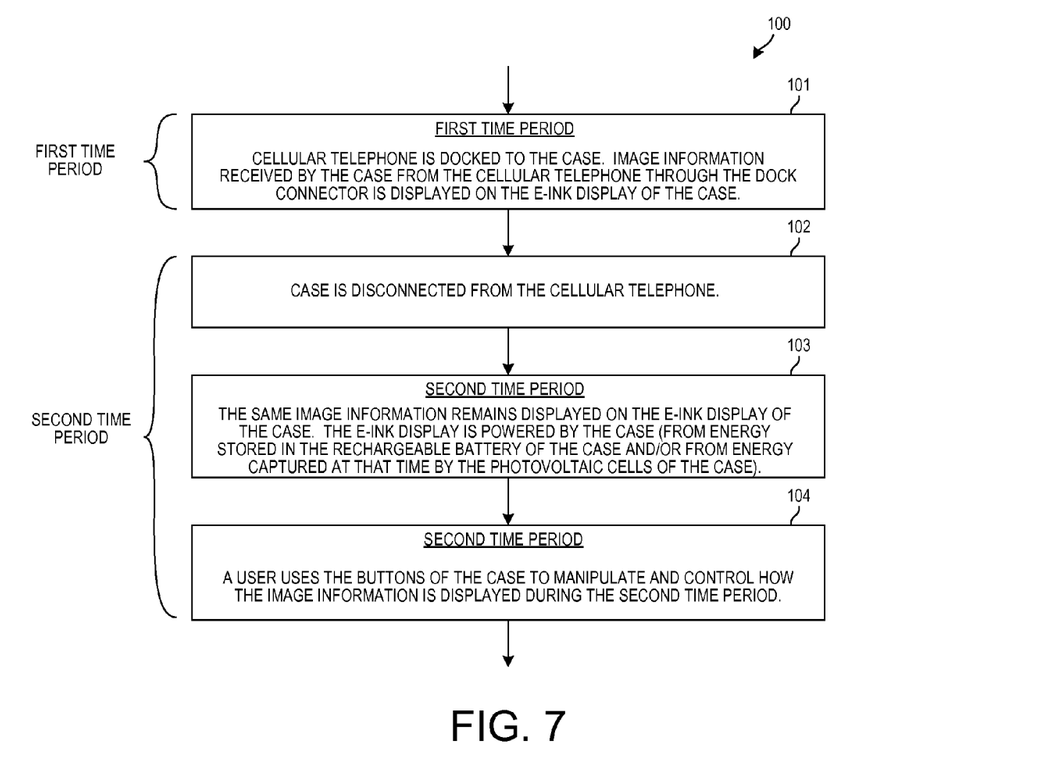
FIG. 7 is a flow chart of a novel method 100 involving the cell phone/case assembly of FIG. 1.

FIG. 7 is a flow chart of a novel method 100 involving the cell phone/case assembly of FIG. 1. During a first time period, the cellular telephone 3 is docked (step 101) to the case 2 as shown in FIG. 1 or FIG. 2. During this first time period, image information from the cellular telephone is transferred across the dock connector 26 of the cellular telephone, and through the plug 27 of the case 2, and to the front side panel 5 of the case so that the image information is then rendered and displayed on the E-ink display 16. An application program (an "app") that was previously downloaded into the cellular telephone and that executes on the cellular telephone may control the cellular telephone such that when a user of the case presses one of the buttons 13-15 during the first time period, then whatever is displayed on the main display 10 of the cellular telephone is transferred to the front side panel 5 and is then displayed on the E-ink display 16.

Next, the case 2 is disconnected (step 102) from the cellular telephone 3. This disconnection event marks the beginning of a second time period. During the second time period, the same image information that was displayed on the E-ink display 16 during the first time period immediately before the disconnection remains displayed (step 103) on the E-ink display 16 after the disconnection and throughout the second time period. During the second time period, the E-ink display 16 is powered by the case 2 (either by energy stored in the rechargeable battery 21 of the case and/or by energy captured by the photovoltaic cells 17-20 of the case 2 during the second time period). The user of the case 2 uses (step 104) one or more of the buttons 13-15 of the case to manipulate and control how the image information is displayed during the second time period. The user may, for example, use the buttons 13-15 to scroll up and to scroll down through a web page that is being displayed on the E-ink display 16.

Figure 8:
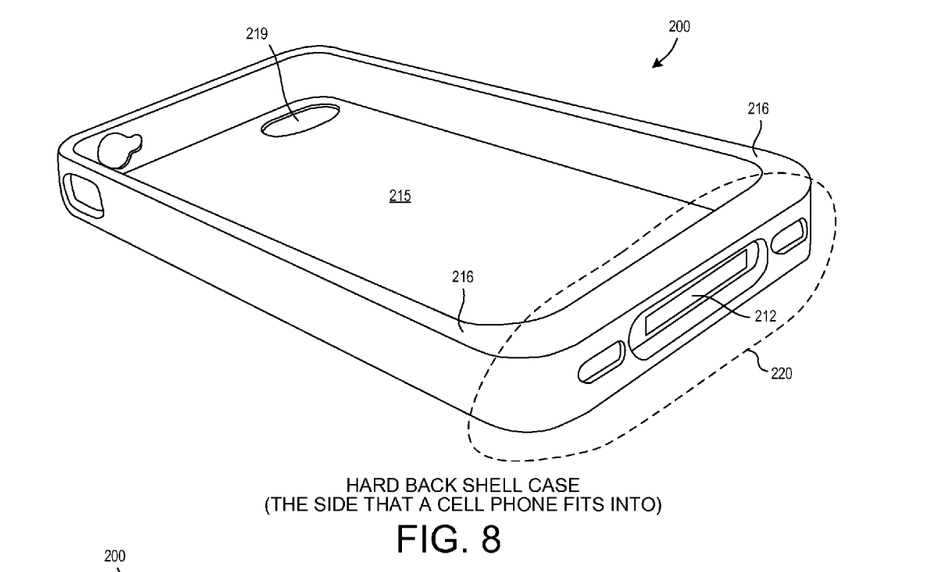
FIG. 8 is a perspective view of the inside of a hard back shell cellular telephone case in accordance with a second novel aspect.

FIG. 8 is a perspective view of the inside of a hard back shell cellular telephone case 200 in accordance with a second novel aspect. The case 200 includes a substantially rectangular hard back portion 215 and a flexible and resilient silicone rubber framing ring 216. A cellular telephone 220 can be forced into the opening seen in FIG. 8 so that a plug 213 on the inside of the case 200 mates with a dock connector socket 214 of the cellular telephone 202. The framing ring 216 deforms and expands under force as necessary to accommodate the cellular telephone 202 being pushed into the case. Once the cellular telephone 202 is in place down in the case 200 with the cellular telephone's back surface in contact with the hard back portion 215 then the lip of the framing ring 216 contracts over the peripheral edge of the cellular telephone 200 thereby holding the cellular telephone in place. The case is longer than the cellular telephone it is designed to retain so that the extra volume 220 at one end of the case is available to house a socket 212 and the plug 213 and intervening conductors and circuitry.

Figure 9:
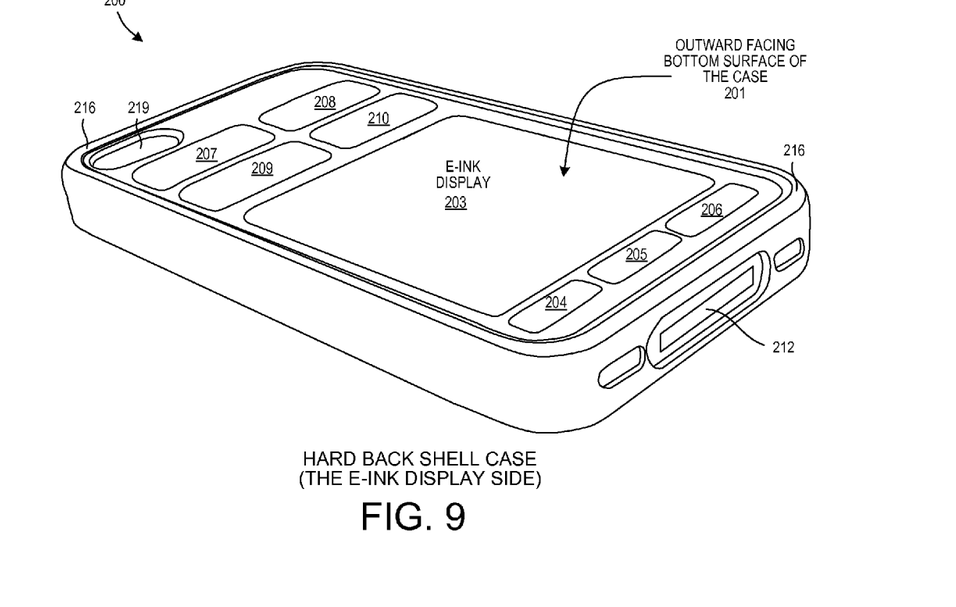
FIG. 9 is a perspective view of the outward facing bottom surface of the case of FIG. 8.
Figure 10:
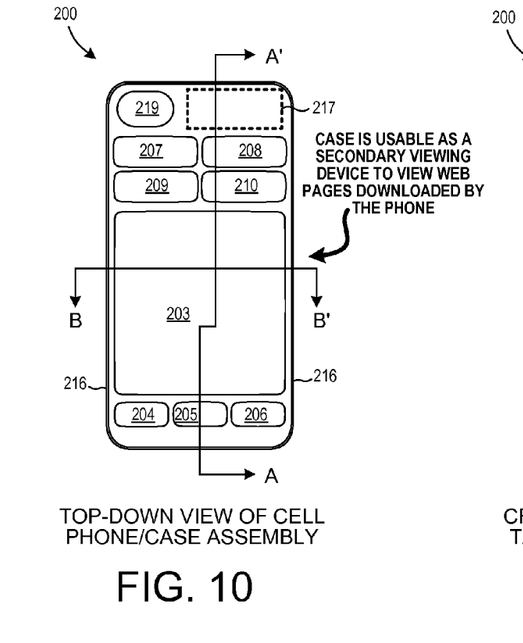
FIG. 10 is a simplified top-down diagram of the cellular telephone/case assembly of FIG. 8.
Figure 11:
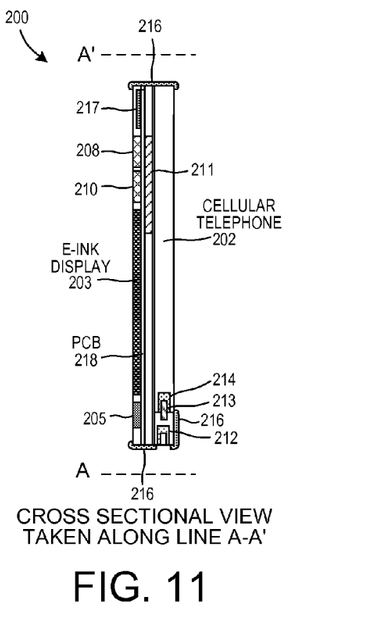
FIG. 11 is a cross-sectional diagram taken along line A-A' of FIG. 10.
Figure 12:
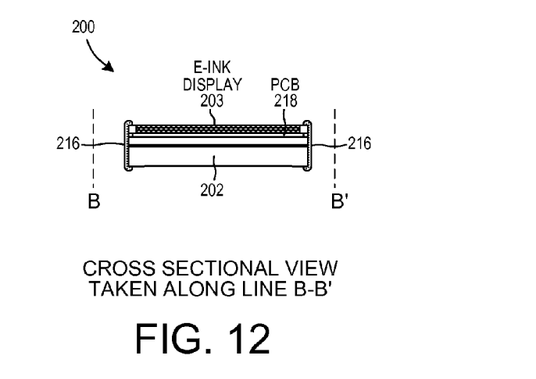
FIG. 12 is a cross-sectional diagram taken along line B-B' of FIG. 10.

FIG. 9 is a perspective view of the outward facing bottom surface 201 of the case 200. FIG. 10 is a top-down diagram of the cell phone/case assembly. FIG. 11 is a cross-sectional diagram taken along line A-A' of FIG. 10. FIG. 12 is a cross-sectional diagram taken along line B-B' of FIG. 10. The case 200 fits over the cellular telephone 202 to cover the back surface of the cellular telephone so that the main display of the cellular telephone 202 is exposed and not covered by the case, and so that the back surface of the cellular telephone 202 is protected and covered by the case. Disposed on the outward facing bottom surface 201 of the case are an E-ink display 203, a plurality of buttons 204-206, and a plurality of high-efficiency single-crystal photovoltaic cells 207-210. When the cellular telephone 220 is in place in the case 220, the main display of the cellular telephone faces in a direction away from the exposed front surface of the cellular telephone (downward in the perspective of FIG. 9), and the E-ink display 203 faces the opposite direction away from the bottom surface 201 of the case (upward in the perspective of FIG. 9). Knowledge on the part of the user that the cover cannot drain the main battery of the cellular telephone is an advantage. The case 200 includes a rechargeable battery 211 that is charged by the photovoltaic cells 207-210, and that cannot be charged by energy from the main battery of the cellular telephone. The case 200 includes a socket 212 for receiving power from an external AC-to-DC power adapter. If the case is not connected to any such AC-to-DC adapter, then the E-ink display 203 is only powered by energy stored in the rechargeable battery 211 and/or by energy captured by the photovoltaic cells 207-210 at that time. The battery of the case is not charged by energy drawn from the main battery of the cellular telephone. Similarly, the E-ink display 203 of the case is not powered by energy drawn from the main battery of the cellular telephone. An AC-to-DC adapter (not shown) can be used to power the case 200, and/or to charge the battery 211 of the case 200, through the case socket 212 either with or without a cellular telephone being docked into the case. At the same time, a supply current from the AC-to-DC adapter can flow in a current path that extends from the socket 212, through the case, to the plug 213, and into the docket connector socket 214 of the cellular telephone. This supply current can be used to power the cellular telephone and/or to recharge the battery of the cellular telephone. Dashed line 217 roughly represents the location of electronic circuitry of the case. Reference numeral 218 identifies a printed circuit board upon which the buttons, the electronic circuitry, the E-ink display and the photovoltaic cells, and the battery are mounted. Reference numeral 219 identifies a hole in the case. This hole 219 is provided so that a camera lens of the cellular telephone 202 will not be covered by the case. The location of this hole 219, and the locations of other cutouts in the case, are particular to the particular type of cellular telephone.

Figure 13:
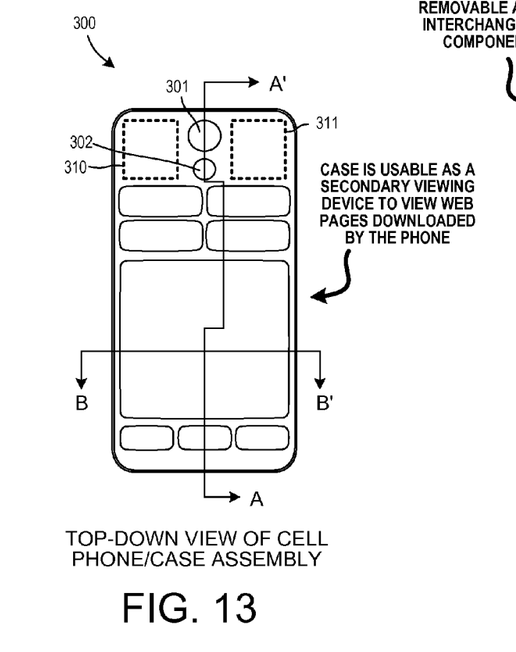
FIG. 13 is a simplified top-down diagram of a cellular telephone/case assembly in accordance with a third novel aspect.
Figure 14:
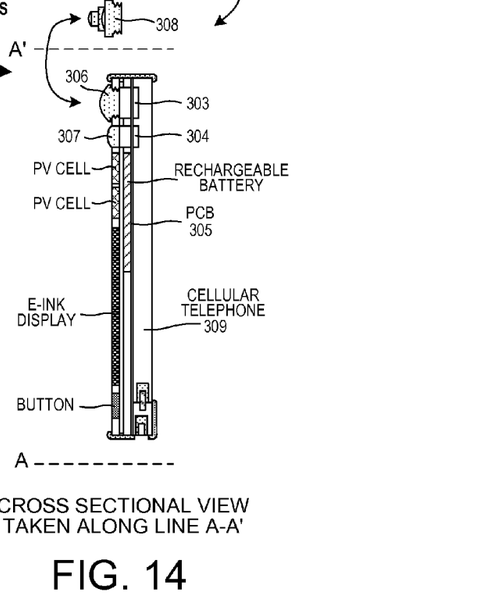
FIG. 14 is a cross-sectional diagram taken along line A-A' of FIG. 13.
Figure 15:
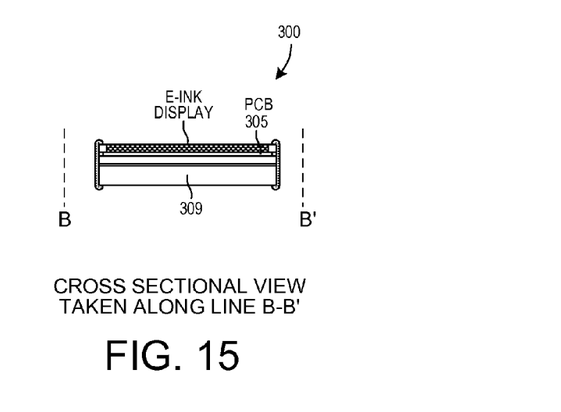
FIG. 15 is a cross-sectional diagram taken along line B-B' of FIG. 13.
Figure 16:
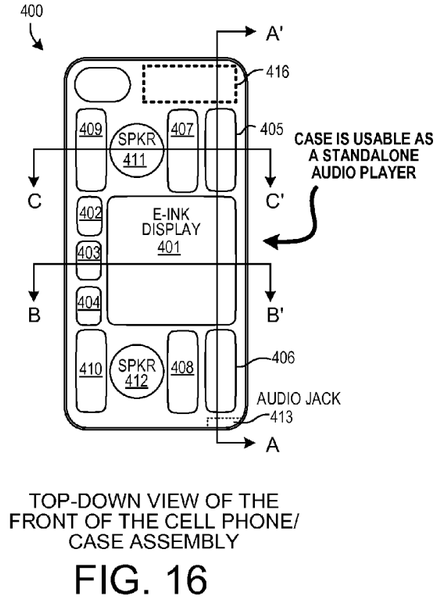
FIG. 16 is a simplified top-down diagram of a cellular telephone/case assembly in accordance with a fourth novel aspect.
Figure 17:
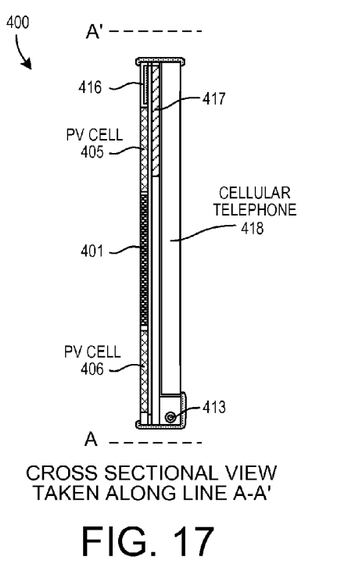
FIG. 17 is a cross-sectional diagram taken along line A-A' of FIG. 16.
Figure 18:
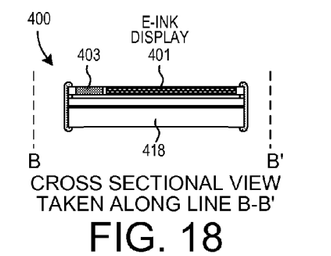
FIG. 18 is a cross-sectional diagram taken along line B-B' of FIG. 16.
Figure 19:
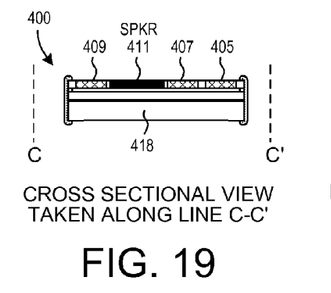
FIG. 19 is a cross-sectional diagram taken along line C-C' of FIG. 16.
Figure 20:
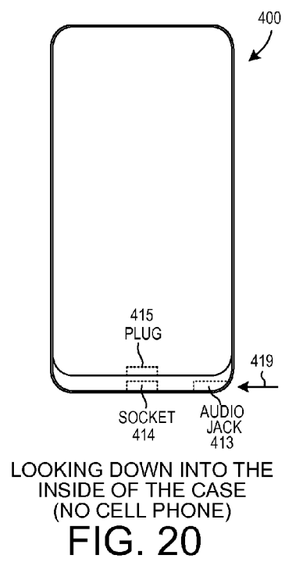
FIG. 20 is a diagram of the inside of the case of the assembly of FIG. 16, in a situation in which no cellular telephone is disposed in the case.
Figure 21:
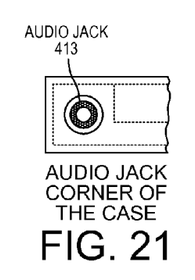
FIG. 21 is a diagram of the corner of the case of FIG. 16 where the audio jack is located.

FIGS. 13-15 are diagrams of another embodiment. The case 300 of FIGS. 13-15 is similar to the case 200 of FIGS. 10-12, except that the case 300 has holes 301 and 302 for accommodating a camera and a flash lamp of a different cellular telephone 309. The dashed lines 310 and 311 indicate the rough area where the electronic circuitry of the case is located. The first hole 301 is positioned over the camera lens, where the camera lens 303 is located on the backside of the cellular telephone 309 as illustrated in FIG. 14. The second hole 302 is positioned over the flash lamp 304, where the flash lamp 304 is located on the backside of the cellular telephone as illustrated in FIG. 14. The first hole 301 extends through the printed circuit board 305 of the case so that light can pass through a lens 306, through the first hole 301, and to the camera lens 303 on the backside of the cellular telephone. The second hole 302 also extends through the printed circuit board 305 of the case so that light from the flash lamp 304 on the backside of the cellular telephone can pass through the second hole, and through an optical lens or diffuser 307, and away from the cell phone/case assembly. In one example, the first hole 301 is threaded and the lens 306 has cooperating threads. The lens 306 can be removably installed in the case 300 by threading the lens 306 into the first hole 301. The lens 306 can also be removed from the case 300, by unscrewing the lens 306 from the first hole 301. Multiple such lenses may have the same kind of threads for engagement with the same first hole 301 so that one lens can be removed from hole 301 and can be replaced with another lens. One other such second lens 308 is illustrated in FIG. 14. In a broader sense, a threaded component (a lens is just one example) is readily removable by hand from the hardback portion of the case by rotation of the threaded component with respect to the hardback portion such that the threaded component is unscrewed from and disengaged from the hardback portion. The case can serve as a general purpose platform to which various different types of removably attachable components can be coupled.

FIGS. 16-21 are diagrams of another embodiment. The case 400 of FIGS. 16-21 is similar to the case 200 of FIGS. 10-12, except that the case 400 has an audio player functionality and no lenses. The case 400 includes a smaller E-ink display 401, a plurality of buttons 402-404, a plurality of photovoltaic cells 405-410, two speakers 411 and 412, an audio jack 413, a socket 414, and a plug 415. The audio jack 413 is for coupling with a cylindrical audio plug of a headphone/earbud assembly (the headphone/earbud assembly is not illustrated). The couple the headphones/earbuds to the case, the plug on the cord of the headphones/earbuds is inserted into the audio jack 413 in the direction of arrow 419. The plug 415 of the case 400 is of a type suitable for mating with the main dock connector socket of a cellular telephone. As in the other embodiments described above, the case 400 can be powered from the socket 414 by an external AC-to-DC adapter either with, or without, a cellular telephone being docked to the case. If a cellular telephone is docked to the case, then the cellular telephone can also be powered from the socket 414. The rechargeable battery 417 of the case 400 can be charged by energy captured by the photovoltaic cells 405-410. The case 400 can receive audio information from the cellular telephone, but the plug, socket and electronic circuitry are such that the cellular telephone does not and cannot power the case 400. Audio files and other information can be transferred through the dock connector of the cellular telephone 418 to the case 400, but the case 400 is otherwise usable as an audio player (for example, an MP3 player) separately and independently of the cellular telephone without the cellular telephone providing power to the case. The E-ink display 401 is usable to display information about the audio functionalities of the case. The E-ink display 401 is usable to display an audio file playlist, wherein the files are stored in the case. The electronic circuitry 416 of the case provides an ability to: store audio information (such as MP3 audio files) in the case, to play the files so as to drive the speakers and/or audio jack so that audio emanates from the speakers and/or headphones/earbuds, to display information about the audio information stored in the case and/or being played by the case, to scroll up and down through the playlist and to make selections using the buttons on the case, and to control the playing of audio using the buttons on the case. When headphones/earbuds are being driven by the case using the audio jack 413, the case 400 does not drive the speakers 411-412.

In another example, the folding-style case of FIG. 1 includes speakers and an audio storing and playing functionality, as well as an audio jack. In this example, the folding-style case is usable as an audio player (for example, an MP3 player) separately and independently of the cellular telephone, but the audio files and information can be loaded into the case through the cellular telephone. Alternatively, the audio files and information can be loaded into the case through a cable (for example, a USB cable) from a computer using the socket 23. The case can be powered via such a cable (for example, where the cable is the cable of an AC-to-DC adapter), with or without any cellular telephone being coupled to the case. In another specific example, the case also includes a microphone such that the case is usable as a hearing aid or sound amplifier. The electronics of the case has an audio player setting, and a hearing aid or sound amplifier setting. When in the hearing aid or sound amplifier setting, ambient environmental sounds that are picked up by the microphone are converted into electrical signals that are then amplified by the electronic circuitry of the case and are driven out onto the audio jack. Amplified sound is then output from headphones or earbuds that are plugged into the audio jack. In the hearing aid and sound amplifier setting, the buttons are usable to control the hearing aid and sound amplifier functionality. In the audio player setting, the buttons are usable to control the audio player functionality.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A folding cellular telephone case adapted to fold over and to couple to a connector of a cellular telephone, the folding cellular telephone case comprising:

a back side panel having an inside surface, a cellular telephone dock connector plug, and a socket, wherein the socket is disposed adjacent an outside surface of the back side panel, wherein the inside surface has a substantially rectangular and substantially planar shape that is substantially conformal to a back surface of the cellular telephone, wherein the plug extends in a direction parallel to the inside surface and extends over a portion of the inside surface such that the plug can engage a socket of the cellular telephone when the cellular telephone is disposed on the inside surface of the back side panel, wherein the socket and plug of the back side panel are electrically coupled such that the cellular telephone can be powered by a supply current that flows in a current path from a source outside the folding telephone case through the socket through the plug and to the cellular telephone, wherein the back side panel has a peripheral edge that has a substantially rectangular shape;

a front side panel that has a peripheral edge, wherein the peripheral edge of the front side panel has a substantially rectangular shape that substantially matches the substantially rectangular shape of the peripheral edge of the back side panel, wherein the front side panel is hinged with respect to the back side panel such that the front side panel can fold over and cover a front surface of the cellular telephone when the back surface of the cellular telephone is disposed on the inside surface of the back side panel, wherein the front side panel has an inside surface that covers and faces the front surface of the cellular telephone when the front side panel is folded over to cover the front surface of the cellular telephone, and wherein the front side panel has an outside face surface that is opposite to the inside surface of the front side panel, wherein the front side panel comprises:

a plurality of buttons disposed on the outside face surface;

a rechargeable battery;

an E-ink display disposed on the outside face surface, wherein the E-link display is coupled to and is powered by the rechargeable battery;

a plurality of photovoltaic devices adapted to charge the rechargeable battery, wherein the photovoltaic devices and the E-ink display occupy different non-overlapping portions of the outside face surface of the front side panel, wherein the photovoltaic devices are not coupled to charge any battery of the cellular telephone through the plug of the back side panel; and electronic circuitry coupled to the plurality of buttons, to the E-ink display, to the rechargeable battery, and to the plug of the back side panel, wherein the case includes no wireless transceiver, wherein during a first time period the electronic circuitry receives image information from the cellular telephone via the plug and causes the image information to be displayed on the E-ink display, wherein during a second time period the electronic circuitry continues to drive the E-ink display such that the image information remains being displayed on the E-ink display upon and after the cellular telephone becoming decoupled from the plug, wherein the first and second time periods are contiguous time periods, and wherein the plurality of buttons are usable during the second period of time to control how the image information is displayed on the E-ink display during the second time period; and a hinge portion coupled to the back side panel and to the front side panel, wherein electrical conductors extend from the plug of the back side panel, through the hinge portion, and to the electronic circuitry of the front side panel, wherein no charging current flows through the hinge portion to charge any battery of the cellular telephone.

2. The folding cellular telephone case of claim 1, wherein the back side panel is adapted to snap fit onto the cellular telephone so that the back surface of the cellular telephone is disposed on the inside surface of the back side panel.

3. The folding cellular telephone case of claim 1, wherein the case comprises a speaker and an audio jack, wherein the electronic circuitry stores an audio file, and wherein the electronic circuitry has an audio player functionality and can drive the jack with audio information derived from playing the audio file.

4. The folding cellular telephone case of claim 3, wherein the buttons are usable to scroll through a playlist displayed on E-ink display.

5. The folding cellular telephone case of claim 1, wherein the case comprises a microphone and an audio jack, and wherein the case is usable as a hearing aid with sound picked up on the microphone and which the electronic circuitry driving the audio jack so that the sound is output from earbuds coupled to the audio jack.

6. The folding cellular telephone case of claim 3, wherein the electronic circuitry can be powered by a supply current received onto the case via the socket in a condition in which there is no cellular telephone coupled to the plug.

7. The folding cellular telephone case of claim 1, wherein the electronic circuitry has an audio player setting and a hearing aid setting.

8. The folding cellular telephone case of claim 1, wherein audio files can be loaded onto the case via the socket in a condition in which no cellular telephone is coupled to the plug.

9. The folding cellular telephone case of claim 1, wherein audio files can be loaded onto the case via the socket in a condition in which a cellular telephone is coupled to the plug.

10. A cellular telephone case comprising:

a plurality of buttons disposed on the outside face surface of the case;

a rechargeable battery;

an E-ink display disposed on the outside face surface of the case, wherein the E-link display is coupled to and is powered by the rechargeable battery;

a plurality of photovoltaic devices adapted to charge the rechargeable battery, wherein the photovoltaic devices and the E-ink display occupy different non-overlapping portions of the outside face surface of the front side panel, wherein the photovoltaic devices are not coupled to charge any battery of any cellular telephone;

a plug for coupling the case to a main docking socket of a cellular telephone; and electronic circuitry coupled to the plurality of buttons, to the E-ink display, to the rechargeable battery, and to the plug, wherein the case includes no wireless transceiver, wherein during a first time period the electronic circuitry receives image information from the cellular telephone via the plug and causes the image information to be displayed on the E-ink display, wherein during a second time period the electronic circuitry continues to drive the E-ink display such that the image information remains being displayed on the E-ink display upon and after the cellular telephone becoming decoupled from the plug, wherein the first and second time periods are contiguous time periods, and wherein the plurality of buttons are usable during the second period of time to control how the image information is displayed on the E-ink display during the second time period.

11. The cellular telephone case of claim 10, wherein the case comprises a hardback portion and a flexible and resilient framing ring, and wherein the outside face surface is a surface of the hardback portion.

12. The cellular telephone case of claim 11, further comprising:
a socket, wherein a supply current received onto the case via the socket can be communicated through the case to the plug and to the main docking socket of the cellular telephone.

13. The cellular telephone case of claim 12, wherein the electronic circuitry can be powered by a supply current received onto the case via the socket in a condition in which there is no cellular telephone coupled to the plug.

14. The cellular telephone case of claim 10, further comprising:
an audio jack, wherein the electronic circuitry stores an audio file, and wherein the electronic circuitry has an audio player functionality and can drive the jack with audio information derived from playing the audio file.

15. The cellular telephone case of claim 14, further comprising:
a speaker.

16. The cellular telephone case of claim 11, further comprising a threaded component, wherein the hardback portion has a threaded hole, and wherein threads on the threaded component engage threads on an inside surface of the threaded hole.

17. The cellular telephone case of claim 11, further comprising:
a microphone.

18. The cellular telephone case of claim 10, wherein the electronic circuitry has an audio player functionality, and wherein the case is usable as an audio player when either coupled to or not coupled to a cellular telephone.

19. The cellular telephone case of claim 10, wherein the electronic circuitry has a hearing aid functionality, and wherein the case is usable as a hearing aid when either coupled to or not coupled to a cellular telephone.

20. The cellular telephone case of claim 16, wherein the threaded component is readily removable from the hardback portion by rotation of the threaded component with respect to the hardback portion such that the threaded component is unscrewed from and disengaged from the hardback portion.

* * * * *